Patented Feb. 9, 1954

2,668,830

UNITED STATES PATENT OFFICE 2,668,830

S,S-BIS(ETHYLXANTHOYL) O-(4-NITROPHENYL) TRITHIOPHOSPHATE

Henry Tolkmith, Midland, Mich., assignor to The Dow Chemical Company, Midland, Mich., a corporation of Delaware No Drawing. Application April 21, 1953, Serial No. 350,243

1 Claim. (Cl. 260—455)

This invention is directed to S,S-bis(ethylxanthoyl) O-(4-nitrophenyl) trithiophosphate of the formula

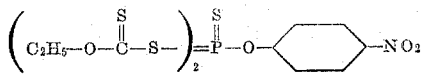

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting one molecular proportion of an alkali metal ethylxanthate with one molecular proportion of S-(ethylxanthoyl) O-(4-nitrophenyl) dithiophosphoric chloride of the formula

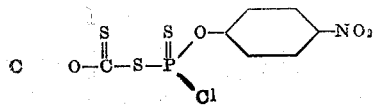

in an inert organic solvent such as benzene or diethyl ether. In practice, sodium ethylxanthate is preferably employed as the alkali metal xanthate reactant.

In carrying out the reaction, the sodium ethylxanthate and S-(ethylxanthoyl) O-(4-nitrophenyl) dithiophosphoric chloride are dispersed in the solvent and the resulting mixture heated with stirring for a period of time at a temperature of from 35° to 80° C. In practice, it is sometimes convenient to operate at the boiling temperature of the reaction mixture and under reflux. Since the desired product has a tendency to decompose at temperatures in excess of 80° C., reaction temperatures substantially in excess of 80° C. for any appreciable period of time should be avoided. Upon completion of the reaction, the mixture may be filtered and the filtrate distilled under reduced pressure at gradually increasing temperatures up to a temperature of 80° C. to separate low boiling constituents and to obtain as a residue the desired S,S-bis(ethylxanthoyl) O-(4-nitrophenyl) trithiophosphate.

The S-(ethylxanthoyl) O-(4-nitrophenyl) dithiophosphoric chloride employed as a starting material in the above-described method may be prepared by reacting one molecular proportion of sodium 4-nitrophenolate with one molecular proportion of S-(ethylxanthoyl) dithiophosphoric dichloride in an inert organic solvent such as benzene. In carrying out the reaction, the reactants are dispersed in the solvent and the resulting mixture heated for a period of time at a temperature of from 35° to 80° C. To avoid decomposition, temperatures substantially in excess of 80° C. for any appreciable period of time should not be employed. Upon completion of the reaction, the mixture may be filtered and the filtrate concentrated by distillation under reduced pressure to a temperature up to 80° C. to obtain as a residue the desired S-(ethylxanthoyl) O-(4-nitrophenyl) dithiophosphoric chloride. This compound is a viscous oil having a density of 1.4901 at 20° C. The latter compound and described method for its production constitute the subject matter of my copending application Serial No. 203,766.

In a representative operation, 15.5 grams (0.108 mole) of sodium ethylxanthate and 35 grams (0.1 mole) of S-(ethylxanthoxyl) O-(4-nitrophenyl) dithiophosphoric chloride were dispersed in 100 milliliters of diethyl ether and the resulting mixture heated for 30 hours at the boiling temperature and under reflux. At the end of this period, the mixture was filtered and the filtrate concentrated by distillation under reduced pressure to a temperature up to 80° C. to obtain as a residue an S,S-bis(ethylxanthoyl) O - (4-nitrophenyl) trithiophosphate product. The latter compound is a viscous oil having a density of 1.4468 at 20° C.

The new S,S-bis(ethylxanthoyl) O-(4-nitrophenyl) trithiophosphate product is effective as a parasiticide and adapted to be employed for the control of a wide range of agricultural and household pests such as flies, mites, aphids, beetles and cockroaches and Southern army worms. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture. In representative operations against two-spotted spider mites and Mexican bean beetles, 100 percent kills of these organisms were obtained with aqueous spray compositions containing 0.25 pound of the toxic trithiophosphate per 100 gallons of spray mixture.

This is a continuation in part of my copending application Serial No. 203,773, filed December 30, 1950.

I claim:

S,S-bis(ethylxanthoyl) O-(4-nitrophenyl) trithiophosphate.

HENRY TOLKMITH.

No references cited.